United States Patent
Furuichi

(10) Patent No.: US 12,464,367 B2
(45) Date of Patent: Nov. 4, 2025

(54) COMMUNICATION SYSTEM, COMMUNICATION DEVICE, AND INFORMATION PROCESSING DEVICE

(71) Applicant: SONY GROUP CORPORATION, Tokyo (JP)

(72) Inventor: Sho Furuichi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 547 days.

(21) Appl. No.: 17/905,855

(22) PCT Filed: Mar. 3, 2021

(86) PCT No.: PCT/JP2021/008283
§ 371 (c)(1),
(2) Date: Sep. 8, 2022

(87) PCT Pub. No.: WO2021/187120
PCT Pub. Date: Sep. 23, 2021

(65) Prior Publication Data
US 2023/0098851 A1    Mar. 30, 2023

(30) Foreign Application Priority Data
Mar. 16, 2020  (JP) ................................ 2020-045375

(51) Int. Cl.
*H04W 16/14* (2009.01)
(52) U.S. Cl.
CPC ................. *H04W 16/14* (2013.01)
(58) Field of Classification Search
CPC ...... H04W 16/14; H04W 28/16; H04W 48/16
See application file for complete search history.

(56) References Cited

U.S. PATENT DOCUMENTS

| | | | |
|---|---|---|---|
| 2013/0194938 A1* | 8/2013 | Immonen | H04B 1/525 370/252 |
| 2014/0094165 A1* | 4/2014 | Karlsson | H04W 16/14 455/423 |

(Continued)

FOREIGN PATENT DOCUMENTS

| | | |
|---|---|---|
| JP | 2012-119778 A | 6/2012 |
| WO | 2020/045131 A1 | 3/2020 |

OTHER PUBLICATIONS

"Unlicensed Use of the 6 GHz Band", Notice of Proposed Rulemaking, ET Docket No. 18-295, GN Docket No. 17-183, FCC(Federal Communications Commissions), Oct. 2, 2018, 48 pages.

(Continued)

*Primary Examiner* — Nizar N Sivji
(74) *Attorney, Agent, or Firm* — CHIP LAW GROUP

(57) ABSTRACT

A communication system includes a plurality of communication devices that executes wireless communication using a frequency of a specific frequency band, and an information processing device that records information regarding interference of the plurality of communication devices with a protection system in the specific frequency band. The communication device executes single interference estimation on the protection system before executing the wireless communication to estimate interference of the wireless communication with the protection system. In addition, the communication device executes the wireless communication in a case where a sum of aggregated interference of the plurality of communication devices with the protection system before executing the single interference estimation obtained from the information and interference estimated by executing the single interference estimation does not exceed a limit value of interference with the protection system.

10 Claims, 9 Drawing Sheets

(56) References Cited

U.S. PATENT DOCUMENTS

| | | | | |
|---|---|---|---|---|
| 2015/0055493 | A1* | 2/2015 | Suga | H04W 48/16 |
| | | | | 370/252 |
| 2021/0258988 | A1* | 8/2021 | Balakrishnan | G06N 3/08 |
| 2021/0266755 | A1* | 8/2021 | Furuichi | H04W 16/14 |

OTHER PUBLICATIONS

"White Space Devices (WSD); Wireless Access Systems operating in the 470 MHz to 790 MHz TV broadcast band; Information on weblistings of TV White Space Databases (TVWSDBs)", Technical Report, ETSI (European Telecommunications Standards Institute), TR 103 231 V1.1.1, Feb. 2014, 08 pages.

"Technical and operational requirements for the operation of white space devices under geo-location approach", ECC Report 186, CEPT Electronic Communications Committee, Jan. 2013, 181 pages.

"Requirements for Commercial Operation in the U.S. 3550-3700 MHz Citizens Broadband Radio Service Band", Wireless Innovation Forum, WINNF-TS-0112, Version V1.9.1, Cbrs Operational and Functional Requirements, Mar. 11, 2020, 81 pages.

"6 GHz Update", Wi-Fi Alliance, Aug. 9, 2019.

International Search Report and Written Opinion of PCT Application No. PCT/JP2021/008283, issued on Jun. 1, 2021, 09 pages of ISRWO.

* cited by examiner

FIG. 6

```
{
        "wapId":"Secondary 1",
        "update": false,
        "pointSingleEntryInterferenceMap": [
                {
                        "protectedEntityId": "Protected Entity AA",
                        "singleEntryInterference": -85.2
                },
                {
                        "protectedEntityId": "Protected Entity BB",
                        "singleEntryInterference": -114.56
                },
                ... <omitted> ...
                {
                        "protectedEntityId": "Protected Entity ZZ",
                        "singleEntryInterference": -96.0
                }
        ],
        "allAreaSingleEntryInterferenceMap": [
                {
                        "protectedEntityId": "Protected Entity 1",
                        "areaSingleEntryInterferenceMap": [
                                -109.0, -116.1, ... <omitted> ..., -90.3
                        ]
                },
                {
                        "protectedEntityId": "Protected Entity 2",
                        "areaSingleEntryInterferenceMap": [
                                -139.0, -76.1, ... <omitted> ..., -112.3
                        ]
                },
                ... <omitted> ...
                {
                        "protectedEntityId": "Protected Entity M",
                        "areaSingleEntryInterferenceMap": [
                                -105.0, -111.8, ... <omitted> ..., -72.3
                        ]
                }
        ]
}
```

COMMUNICATION SYSTEM, COMMUNICATION DEVICE, AND INFORMATION PROCESSING DEVICE

CROSS REFERENCE TO RELATED APPLICATIONS

This application is a U.S. National Phase of International Patent Application No. PCT/JP2021/008283 filed on Mar. 3, 2021, which claims priority benefit of Japanese Patent Application No. JP 2020-045375 filed in the Japan Patent Office on Mar. 16, 2020. Each of the above-referenced applications is hereby incorporated herein by reference in its entirety.

TECHNICAL FIELD

The present disclosure relates to a communication system, a communication device, and an information processing device.

BACKGROUND ART

Hitherto, due to an increase in wireless environments in which various wireless systems are mixed and enrichment of contents provided wirelessly, a depletion problem of wireless resources (for example, frequencies) that can be allocated to wireless systems has become apparent. However, since all the frequency bands are used for existing wireless systems, it is difficult to newly allocate wireless resources. Accordingly, as a means for squeezing necessary wireless resources, "dynamic spectrum access (DSA)" that utilizes a cognitive wireless technology and utilizes temporal and spatial vacancies (white spaces) among frequency bands allocated to a specific wireless system has rapidly attracted attention.

CITATION LIST

Non Patent Document

Non Patent Document 1: FCC (Federal Communications Commissions), "Unlicensed Use of the 6 GHz Band Notice of Proposed Rulemaking ET Docket No. 18-298; GN Docket No. 17-183," Oct. 2, 2018, "https://docs.fcc.gov/public/attachments/DOC-354364A1.pdf"

Non Patent Document 2: WI-FI ALLIANCE, "6 GHz Update", Aug. 9, 2019, "https://ecfsapi.fcc.gov/file/10812984812495/WFA %20Ex %20Parte %20-%20August%209%20Meeting.pdf"

Non Patent Document 3: ETSI (European Telecommunications Standards Institute), "TR 103 231 V1.1.1 White Space Devices (WSD); Wireless Access Systems operating in the 470 MHz to 790 MHz TV broadcast band; Information on weblistings of TV White Space Databases (TVWSDBs)," February, 2014, https://www.etsi.org/deliver/etsi_tr/103200 103299/103231/01.01.01_60/tr_103231v010101p.pdf Non Patent Document 4: CEPT ECC, "ECC Report 186 Technical and operational requirements for the operation of white space devices under geo-location approach," January 2013, "https://www.ecodocdb.dk/download/124023a2-73ee/ECCREP186.PDF"

Non Patent Document 5: Wireless Innovation Forum, "WINNF-TS-0112-V1.9.0 Requirements for Commercial Operation in the U.S. 3550-3700 MHz Citizens Broadband Radio Service Band," December 2019, "https://winnf.memberclicks.net/assets/CBRS/WINNF-TS-0112.pdf"

SUMMARY OF THE INVENTION

Problems to be Solved by the Invention

As a new shared band, a 6 GHz band is presently attracting attention. The United States Federal Communications Commission (FCC) has announced that a frequency band from 5,925 to 7,125 MHz is newly opened for unlicensed use. In addition, revisions on sharing a frequency band from 5,925 to 6,425 MHz are in progress at the European Conference of Postal and Telecommunications. Administrations. In addition, it is clear that the Wi-Fi Alliance (WFA) established the AFC Task Group for sharing the 6 GHz band. In the AFC Task Group, models that have not been studied much in the frequency sharing discussion so far have been studied.

FIG. 1 is a diagram illustrating a model called Embedded AFC. This model is one of the models studied in AFC Task Group. In dynamic spectrum access, each access point provides a wireless communication service that enables communication between terminals by executing wireless communication with the terminals (clients). In the model, each access point calculates frequencies available for executing wireless communication services and selects a channel to be used from among the available frequencies. Accordingly, since the frequency used by a network side using the frequency when the wireless communication service is executed is determined, the model can be said to be a network-driven spectrum sharing type model.

However, in such a model, a mechanism for protecting a primary system to be protected in dynamic spectrum access is insufficient. For example, there is a server that manages radio wave utilization called a spectrum access system (SAS) managed by a CBRS organization in the U.S. Citizens Broadband Radio Service (CBRS) that is a representative example of the dynamic spectrum access. The SAS collectively determines communication parameters of each wireless communication service for all the access points. Thus, interference in the primary system is prevented from exceeding an allowable limit value.

On the other hand, in the case of Embedded AFC, since the network side using the frequency determines the frequency, it is necessary for each access point to exchange information and determine communication parameters such as transmission power in order to prevent the interference in the primary system from exceeding an allowable value. That is, it is necessary for different service providers providing different wireless communication services to directly communicate with each other. Therefore, for example, security concerns arise. In addition, since a timing at which each access point determines the communication parameters varies, the primary system may not be sufficiently protected.

Accordingly, the present disclosure provides a device or the like that executes a process of guaranteeing protection for a protection system when a communication device itself, such as an access point, that executes wireless communication determines a frequency or the like used for the wireless communication.

Solutions to Problems

According to an aspect of the present disclosure, a communication system includes a plurality of communication devices configured to execute wireless communication using a frequency of a specific frequency band; and an information processing device configured to record information regarding interference of the plurality of communication devices with a protection system in the specific frequency band. The communication device executes single interference estimation on the protection system before executing the wireless communication to estimate interference of the wireless communication with the protection system. In addition, the communication device executes the wireless communication in a case where a sum of aggregated interference of the plurality of communication devices with the protection system before executing the single interference estimation obtained from the information and interference estimated by executing the single interference estimation does not exceed a limit value of interference with the protection system.

Thus, the protection of the primary system is guaranteed while the communication device itself determines the frequency or the like used for wireless communication. In addition, in order to protect the primary system, it is not necessary for the communication devices to exchange information with each other. Therefore, security is excellent.

The communication device may transmit a value of the interference estimated by executing the single interference estimation to the information processing device.

The information processing device may authorize the execution of the wireless communication in a case where a sum of aggregated interference with the protection system due to each communication device authorized to execute the wireless communication and interference estimated by executing the single interference estimation does not exceed a limit value of interference with the protection system.

The communication device may be authorized to execute the wireless communication and executes the wireless communication.

The communication system may have such a configuration.

The communication device may
  acquire the information from the information processing device,
  execute checking that the sum of the aggregated interference of the plurality of communication devices with the protection system before executing the single interference estimation obtained from the information and the interference estimated by executing the single interference estimation does not exceed the limit value of the interference with the protection system, and
  execute the wireless communication using a set value used for the single interference estimation in a case where the checking is obtained.

The communication system may have such a configuration.

Note that the single interference estimation may be estimation of interference with the protection system by only wireless communication of the communication device executing the single interference estimation.

According to another aspect of the present disclosure, a communication device includes:
  an estimator configured to execute single interference estimation with respect to a protection system in a specific frequency band before executing wireless communication using a frequency of the specific frequency band to estimate interference of the wireless communication with the protection system; and
  a wireless communicator configured to execute the wireless communication in a case where a sum of aggregated interference of a plurality of communication devices with the protection system before executing the single interference estimation and interference estimated by executing the single interference estimation does not exceed a limit value of interference with the protection system.

The communication device may further include:
  a transmitter configured to transmit a value of the interference estimated by the executing the single interference estimation to a predetermined information processing device; and
  an acquirer configured to acquire authorization for the execution of the wireless communication from the information processing device in the case where the sum of the aggregated interference of the plurality of communication devices with the protection system before executing the single interference estimation and the interference estimated by executing the single interference estimation does not exceed the limit value of interference with the protection system.

The wireless communicator may be authorized to execute the wireless communication and execute the wireless communication.

The communication device may have such a configuration.

The communication device may further include an acquirer configured to acquire information regarding interference of the plurality of communication devices with the protection system.

The wireless communicator may
  execute checking that the sum of the aggregated interference of the plurality of communication devices with the protection system before executing the single interference estimation obtained from the information and the interference estimated by executing the single interference estimation does not exceed the limit value of the interference with the protection system, and
  execute the wireless communication using a set value used for the single interference estimation in a case where the checking is obtained.

The communication device may have such a configuration.

According to still another aspect of the present disclosure, an information processing device includes:
  an acquirer configured to acquire information regarding interference estimated in single interference estimation for a protection system in a specific frequency band, the single inference estimation being executed by each of a plurality of communication devices executing wireless communication using a frequency in the specific frequency band;
  an authorizer configured to authorize execution of the wireless communication in a case where a sum of aggregated interference with the protection system due to each communication device authorized to execute the wireless communication and interference estimated by executing the single interference estimation does not exceed a limit value of interference with the protection system; and
  a storage configured to store interference estimated by executing the single interference estimation as interference with the protection system in a case where the execution of the wireless communication is authorized.

BRIEF DESCRIPTION OF DRAWINGS

FIG. 6 is a diagram illustrating an example of conversion to a form of a JSON object.

MODE FOR CARRYING OUT THE INVENTION

Figure 1:
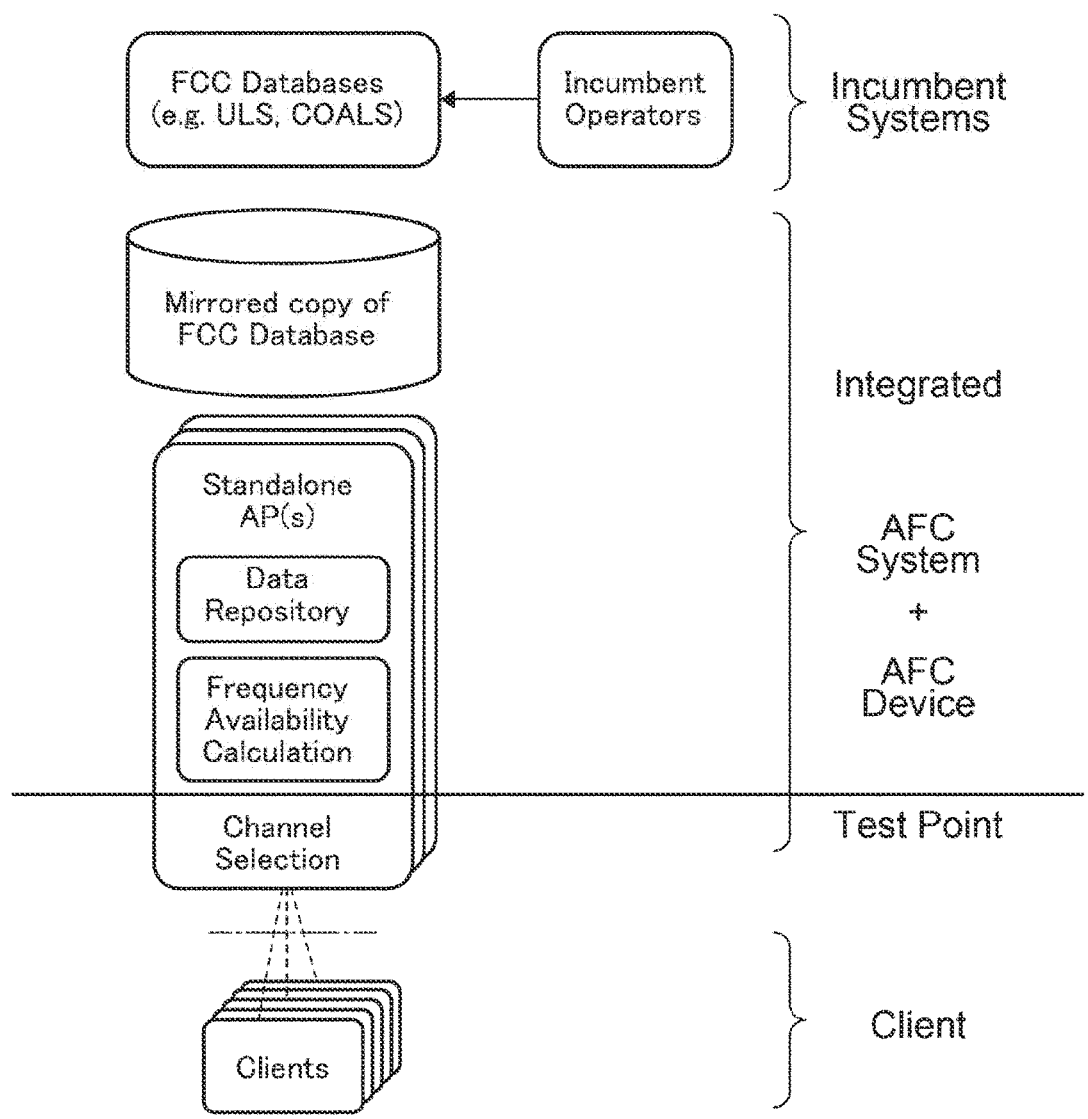
FIG. 1 is a diagram illustrating a model called Embedded AFC.
Figure 2:
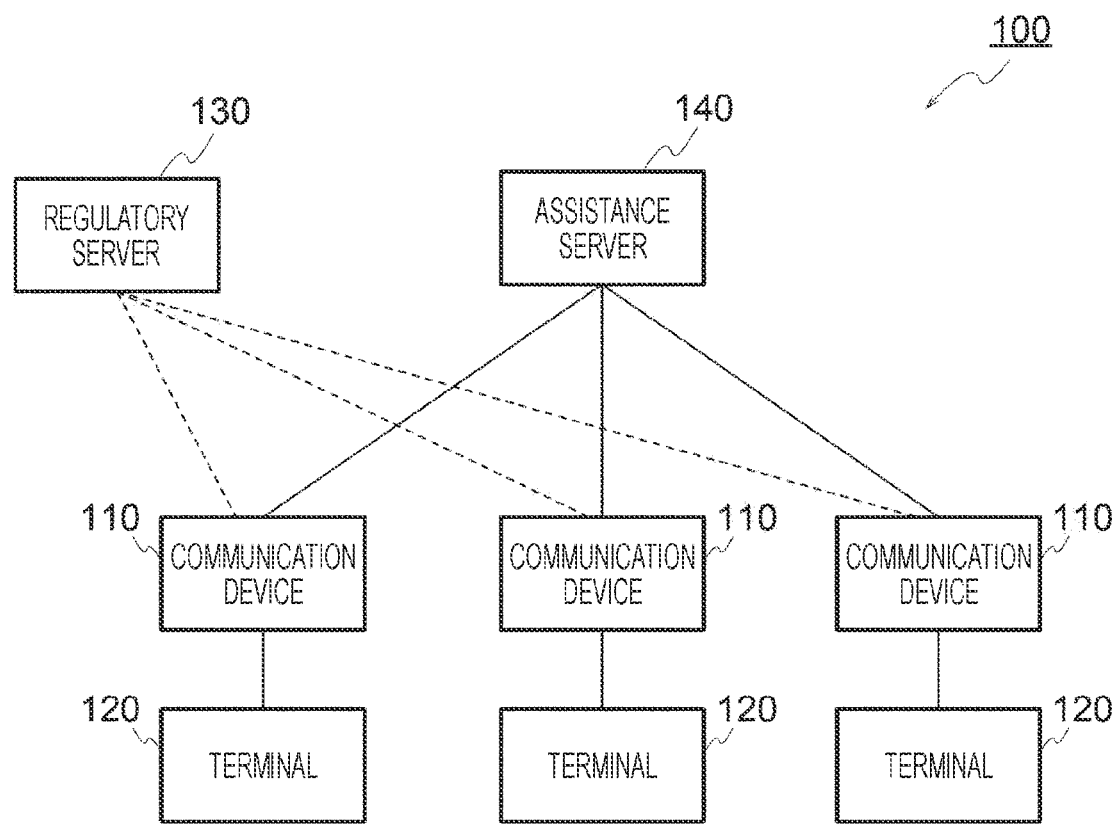
FIG. 2 is a diagram illustrating a system model according to an embodiment of the present disclosure.

FIG. 2 is a diagram illustrating a system model according to an embodiment of the present disclosure. The system model according to the present embodiment is represented by a communication network 100 and includes a communication device 110, a terminal 120, a regulatory database 130, and an assistance server 140.

In the present embodiment, a communication system executes wireless communication using a frequency of a specific frequency band. The wireless communication is executed by the plurality of communication devices 110. Each communication device 110 executes wireless communication with a subordinate terminal 120 to enable communication between the terminals 120. In addition, the frequency used for the wireless communication is determined by a wireless communication network side, specifically, the communication device 110. Therefore, in other words, in the present embodiment, network-driven spectrum sharing is executed. In the present disclosure, a process of determining a frequency will be described.

The communication network 100 includes at least a primary system and a secondary system. The primary system is a system to be protected (a protection system) in a specific frequency band and is required to inhibit interference from other systems to a predetermined limit value or less. The secondary system is a system that is not a primary system. The primary system and the secondary system each include the communication devices 110, or the communication devices 110 and the terminals 120. Although various communication systems can be treated as the primary system or the secondary system. In the present embodiment, it is assumed that the primary system is a wireless system that uses a specific frequency band and the secondary system is a wireless system that shares a part or all of the frequency band. That is, the present system model will be described as a model of a communication system related to a dynamic spectrum access (DSA). Note that the present system model is not limited to a system related to dynamic spectrum access.

Note that, in the dynamic spectrum access, there is typically a communication control device such as a geolocation database (GLDB) or a spectrum access system (SAS) that supervises use of radio waves and, for example, determines a frequency to be used. Here, as described above, in the present embodiment, since the determination of the frequency to be used is executed by the communication device 110, it is assumed in description that there is no communication control device in the present disclosure. Here, the communication control device may as well be included in the communication network 100, and a process other than a process executed by the communication device 110 in the present embodiment may be executed by the communication control device.

Note that, in the present description, terms of a specific system such as CBRS of the United States are used to facilitate understanding in some cases. However, in a case where content of the present disclosure is applied to another system, these terms should be read as if replaced with terms of other systems. In addition, the frequency band is not limited to a specific band such as a 6 GHz band.

Each constituent device (entity) of the communication network 100 will be described below.

As described above, the communication device 110 is a wireless device that provides a wireless communication service for enabling communication between the terminals 120. Typically, a wireless base station (a base station, Node B, eNB, gNB, or the like), a wireless access point (WAP), or the like corresponds to the communication device 110. In addition, the communication device 110 may be a wireless relay device or an optical extension device called a remote radio head (RRH).

Note that, in the following description, unless otherwise stated, the communication device 110 will be described as an entity included in a secondary system.

A coverage (a communication area) provided by the communication device 110 is permitted to have any of various sizes from a large size such as a macro cell to a small size such as a pico cell. Like a distributed antenna system (DAS), the plurality of communication devices 110 may form one cell. In addition, in a case where the communication device 110 has a beamforming capability, a cell or a service area may be formed for each beam.

The communication device 110 is not necessarily fixedly installed. For example, the communication device 110 may be installed in a moving object such as an automobile. In addition, the communication device 110 does not necessarily have to be on the ground. For example, the communication device 110 may be included in an object such as an aircraft, a drone, a helicopter, a high altitude platform station (HAPS), a balloon, or a satellite which is in the air or space. In addition, for example, the communication device 110 may be included in an object such as a ship or a submarine which is on the sea or under the sea.

The communication device 110 can be used, operated, or managed by various operators. For example, a mobile network operator (MNO), a mobile virtual network operator (MVNO), a mobile network enabler (MNE), a mobile virtual network enabler (MVNE), a shared facility service provider, a neutral host network (NHN) service provider, a broadcasting service provider, an enterprise, an educational institution (a school institution, a board of education of a local government, or the like), a real estate (building, apartment, or the like) administrator, an individual, and the like can be assumed as a service provider related to the communication device 110. Note that the service provider related to the communication device 110 is not particularly limited. In addition, the communication device 110 may be a shared facility used by a plurality of service providers. In addition, different service providers may execute installation, usage, and management of the facilities.

The communication device 110 operated by a service provider is typically connected to the Internet via a core network. In addition, operation, management, and maintenance are executed by a function called Operation, Administration & Maintenance (OA&M).

In order to determine a frequency or the like to be used, the communication device 110 executes the following process assuming that a function of a server such as a geolocation database (GLDB) or a spectrum access system (SAS) supervising use of radio waves is provided in typical dynamic spectrum access.

For example, the communication device 110 accesses the regulatory database 130 and acquires information regarding protection of the primary system, such as a primary service and an exclusion zone. In addition, such information is stored (information maintenance).

Examples of information necessary for protecting the primary system include positional information of the primary system, communication parameters of the primary system, an out-of-band emission (OOBE) limit, an adjacent channel leakage ratio (ACLR), adjacent channel selectivity, and a fading margin, a protection ratio (PR). In a district where a fixed numerical value, an acquisition method, a derivation method, and the like are defined by a law or the like in order to protect the primary system, it is desirable to use information defined by the law as information necessary for protecting the primary system.

For example, the communication device 110 enforces the exclusion zone. The exclusion zone is also referred to as a secondary use prohibited area, and is used to determine an available frequency. Specifically, for example, in a case where the communication device 110 is installed in the secondary use prohibited area installed in order to protect the primary system using a frequency channel F1, the communication device 110 excludes the frequency channel F1 from the available channels on the basis of the exclusion zone.

For example, the communication device 110 calculates communication parameters (operational parameters) in the wireless communication provided by the communication device 110, such as an available frequency and maximum allowable transmission power that do not give harmful interference to the primary service. In addition, the communication device 110 may calculate an available range of the communication parameter.

Furthermore, the communication device 110 in the present embodiment executes the following processes. Details of these processes will be described below.

Single-station interference estimation (single-entry interference).

Generation of a single station interference map (for area protection).

Transmission of a result of the single station interference estimation to the assistance server 140.

Acquisition of a protection criteria map (PCM) from the assistance server 140.

Determination of communication parameter based on the protection criteria map or the like.

Note that, in the present embodiment, the frequency to be used is determined by the communication device 110, but it is conceivable that the frequency to be used may be determined by a radio wave utilization supervision server in some cases such as an emergency situation. Therefore, the communication device 110 may also have a function of the related art required when the radio wave utilization is managed by the radio wave utilization supervision server.

The terminal 120 (user equipment, a user terminal, a user station, a mobile terminal, a mobile station, or the like) is a device that executes wireless communication in accordance with a wireless communication service provided by the communication device 110. Typically, a communication device such as a smartphone corresponds to the terminal 120. Note that a device that has the wireless communication function can correspond to the terminal 120. For example, a device such as a business-use camera that has a wireless communication function can also correspond to the terminal 120 even if the wireless communication is not a main application. In addition, a communication device that transmits data to the terminal 120, such as a broadcasting field pickup unit (FPU) that transmits an image for television broadcasting and the like from the outside (site) of a broadcasting station to the broadcasting station in order to execute sports agency or the like, also corresponds to the terminal 120. In addition, the terminal 120 is not necessarily used by a person. For example, like so-called machine type communication (MTC), a device such as a sensor installed in a factory machine or a building may be connected via a network to operate as the terminal 120. In addition, a device called customer premises equipment (CPE) provided to ensure Internet connection may behave as the terminal 120.

In addition, as represented by device-to-device (D2D) and vehicle-to-everything (V2X), the terminal 120 may have a relay communication function.

In addition, similarly to the communication device 110, the terminal 120 is not required to be fixedly installed or be on the ground. For example, an object such as an aircraft, a drone, a helicopter, or a satellite which is in the air or the space may operate as the terminal 120. In addition, for example, an object such as a ship or a submarine which is on the sea or under the sea may operate as the terminal 120.

In the present disclosure, unless otherwise specified, the terminal 120 corresponds to an entity that terminates a radio link using a frequency provided by a wireless access point. Here, depending on a function of the terminal 120 or an applied network topology, the terminal 120 can operate similarly to the communication device 110. In other words, depending on a network topology, a device that can correspond to the communication device 110 such as a wireless access point can correspond to the terminal 120, or a device that can correspond to the terminal 120 such as a smartphone can correspond to the communication device 110.

The regulatory database 130 is a database that records information necessary for protection, such as positional information of the primary system, and is managed or operated by a national regulatory authority (NRA) of a country or a district. Normally, the communication device 110 acquires information necessary for protecting the primary system from the regulatory database 130, and executes the above-described processes using the information.

Examples of the regulatory database 130 include the universal licensing system (ULS) and the international bureau filing system (IBFS) operated by the Federal Communications Commissions (FCC). In addition, a database that records the communication device 110 and the terminal 120 authenticated to be suitable, such as an equipment authorization system (EAS) managed by an office of engineering and technology (OET) of the FCC, also corresponds to the regulatory database 130. In addition, a public institution web site at which a kml file describing a protection area can be downloaded, for example, National Telecommunications and Information Administration (NTIA) or the like, also corresponds to the regulatory database 130.

The communication device 110 acquires information used to protect the primary system from the regulatory database 130. However, in order to sufficiently protect the primary system regardless of countries, districts, or the like, it is preferable that the following information can be acquired as information necessary for protecting the primary system.

Wireless types of the primary system. For example, the information may be information indicating a fixed satellite, a backbone wireless system, or the like.

Information regarding a frequency to be used.

Information regarding transmission power.

Positional information such as latitude and longitude.

Antenna information such as a gain, a height, and a type of antenna.

Information regarding an exclusion zone. The exclusion zone can be represented with, for example, a kml file, a polygon, a separation distance, a plane, a space, or the like.

Information regarding a protection point or a protection area. The information may be represented with latitude, longitude, a kml file, a polygon, a plane, a space, or the like.

Information regarding an area in which the communication device 110 of an interference calculation target is installed. For example, the information may be represented with a kml file, a polygon, a separation distance, a plane, a space, and the like.

Information regarding protection criteria. For example, the information may be represented with a carrier-to-interference noise ratio (C/I), a carrier-to-noise ratio (C/N), a signal-to-noise ratio (SNR), a noise interference ratio (SINR), a protection ratio (PR), allowable maximum interference power, or the like.

A fading margin

Propagation model

Clutter and Terrain Information

Note that the communication device 110 may acquire information other than the foregoing information or may acquire information from a database different from the regulatory database 130. For example, regulatory requirements can be provided in the communication device 110 in some cases. In these cases, a database server that stores information regarding the regulatory requirements may be provided separately from the regulatory database 130. In these cases, the communication device 110 may acquire the information regarding the regulatory requirements from a database server different from the regulatory database 130. Note that the regulatory requirements may include, for example, an out-of-band emission (OOBE) limit, an adjacent channel leakage ratio (ACLR), adjacent channel selectivity, blocking characteristic (Blocking), and the like.

In addition, in a case where a communication system is implemented across many countries as in Europe, the assistance server 140 and the regulatory database 130 may be provided separately in each country. In this case, a server that provides information to discover a database of each country may be separately prepared. Note that a collection of the information is described as a global database, and the server is described as a database discovery server. In a case where there is a database discovery server, the communication device 110 may first access the database discovery server and acquire information, for example, a uniform resource locator (URL) for accessing the assistance server 140 or the regulatory database 130 in the country or the district to which the communication device 110 belongs. Note that, for example, as in ETSI TR 103 231, in a case where a public list (Weblisting information) indicating the referable regulatory database 130 can be acquired for each regulatory domain, the regulatory database 130 may be accessed on the basis of the public list. In this case, there may be no database discovery server.

Note that the information used to protect the primary system may not be directly acquired from the regulatory database 130 or the like in some cases. For example, an administrator or the like of the communication network 100 may acquire the information from the regulatory database 130 and distribute the information to each communication device 110. Therefore, communication between the regulatory database 130 and the communication device 110 is not necessarily executed. Therefore, in FIG. 2, a connection line (link) between the communication device 110 and the regulatory server 130 is indicated by a dotted line.

The assistance server 140 is a server (an information processing device) that assists a process of the communication device 110 that enables primary system protection and use of a specific frequency band of a secondary system. The assistance server 140 eliminates the need for communication between the communication devices 110.

The assistance server 140 according to the present embodiment executes the following process. Details of these processes will be described below.

Eligibility check of the communication device 110.

Determination of authorization of radio wave transmission (wireless communication) of the communication device 110 based on the protection criteria map.

Record information (for example, a protection criteria map) regarding interference of communication device.

Provision of information (for example, a protection criteria map) regarding interference of ca communication device.

Note that the assistance server 140 is different from a radio wave using supervision server of the related art in dynamic spectrum access, for example, a TVWS database (TVWSDB), a geolocation database (GLDB), a spectrum access system (SAS), or the like in the following points.

Positional information of communication device 110 is not registered.

Cumulative interference calculation and interference margin allocation are not executed.

The system model according to the present embodiment includes the entities as described above, and enables the terminals 120 under the control of the communication devices 110 to communicate with each other through radio waves provided by the communication devices 110, that is, wireless communication. However, communication between other entities may be wired or wireless communication.

Figure 3:
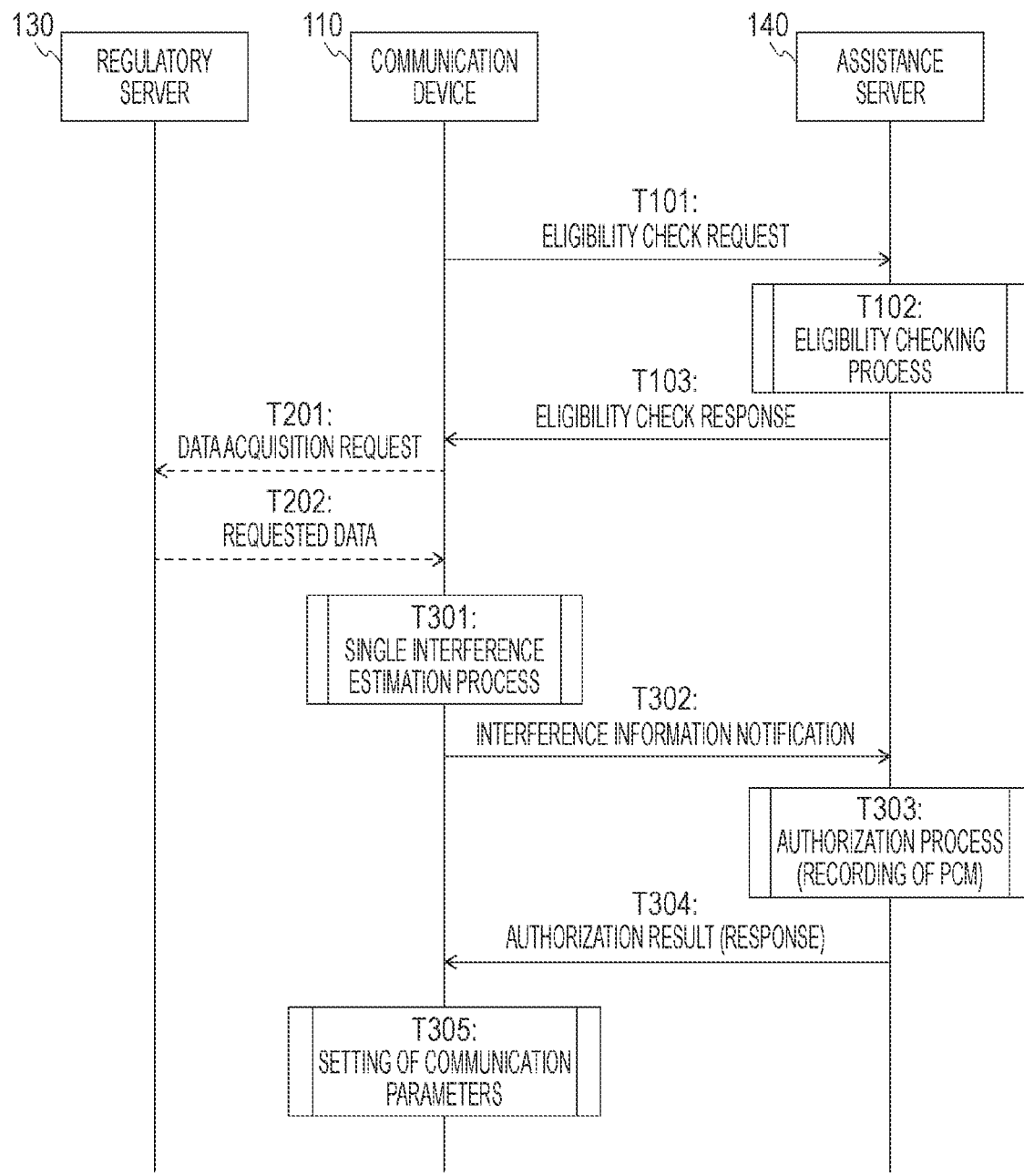
FIG. 3 is a diagram illustrating an example of a communication sequence.

Next, a series of processes executed to start wireless communication of the communication device 110 will be described. FIG. 3 is a diagram illustrating an example of a communication sequence. A process executed in each entity will be described with reference to FIG. 3.

Note that the process of each communication device 110 is individually and independently executed by each communication device 110. The assistance server 140 that communicates with each of the communication devices 110 executes a process not in consideration of the plurality of communication devices 110 at the same time but in consideration of only one communication device 110 which is presently communicating. That is, the assistance server 140 corresponds to the communication device 110 in the earliest order. Therefore, in FIG. 3, it is assumed that one communication device 110 is executing communication.

First, a procedure for checking eligibility of the communication device 110 is executed. This procedure is a procedure for checking whether the communication device 110 is eligible to use a target frequency band. A process from T101 to T103 in FIG. 3 is included in the procedure.

The communication device 110 transmits, to the assistance server 140, an eligibility check request for requesting to check the eligibility (T101). The communication device 110 transmits the information checked by the assistance server 140 along with the eligibility check request. The information may be determined in advance, or the assistance server 140 that has received the eligibility check request may request the information from the communication device 110.

Note that, in the eligibility check request, it is preferable to use a secure scheme such as HTTPS (HTTP plus TLS). A client certificate used in the case of HTTPS is also a checking target in the eligibility checking process.

When the eligibility check request is received, the assistance server 140 executes an eligibility checking process (T102). Items to be checked in the eligibility checking process include, for example, the following.

The assistance server 140 checks an authentication passage status. Specifically, it is checked whether the communication device 110 has acquired an authentication of a public institution or the like. Examples of the authentication include an FCC ID, a CE mark indicating that European safety standards are satisfied, a technical standard compliance certification number, a construction design certification number, and a notification number of technical standard compliance self-checking. Note that forms (for example, a batch number and a barcode) or the like of these notations (for example, new notation, old notation, and the like) are not particularly limited.

In addition, the assistance server 140 checks whether the assistance server 140 satisfies the security requirement. For example, it is checked whether a client certificate required for access is legitimate.

Note that the information to be checked is not limited to the above. For example, information regarding a device included in the communication device 110 (a base station) may be checked.

In a case where an abnormality is not detected in the eligibility checking process, the assistance server 140 issues an eligibility identifier (ID) as an ID indicating that the eligibility checking process has been normally completed.

Note that the eligibility ID is preferably recorded in the assistance server 140 as registration information regarding the communication device 110. For example, in the subsequent process, in a case where the communication device 110 with the eligibility ID transmits the eligibility ID to the assistance server 140, the assistance server 140 can omit or simplify the eligibility checking.

Note that the assistance server 140 may encrypt the eligibility ID using a secret key. In that case, even if the eligibility ID is not recorded in the assistance server 140, the eligibility Check after issuing the eligibility ID can be simplified. This is because the eligibility ID that can be decoded using a secret key can be recognized as an authorized ID when a request including the eligibility ID is received.

Note that, in a procedure to be executed subsequently, the eligibility checking in which the eligibility ID for the communication device 110 is used may be executed, but will be omitted in the following description.

After the eligibility checking process ends, the assistance server 140 returns an eligibility check response to the communication device 110 (T103). Note that, in a case where the eligibility checking process is normally completed, the eligibility ID is responded. However, in a case where the eligibility checking process is not normally completed, for example, in a case where the eligibility check request is imperfect or an abnormality is detected in the eligibility checking process, a response code indicating a reason that the eligibility checking process is not normally completed is preferably responded. Further, when an abnormality is detected in the client certificate, an HTTP status code (for example, 400 Bad Request, 403 Forbidden, or the like) may be responded instead of the response code.

Next, a procedure for acquiring information necessary for protecting the primary system is executed. A process of T201 and T202 in FIG. 3 is included in this procedure.

The communication device 110 transmits a data retrieval request to the regulatory database 130 (T201). As a reply to a data acquisition request, the regulatory database 130 transmits requested data that is, information necessary for protecting the above-described primary system, as a response to the data retrieval request, to the communication device 110 (T202). As a result, the communication device 110 enters a state in which a procedure related to the protection of the primary system can be executed.

The communication device 110 holds information necessary for protecting the primary system. Therefore, when it is not necessary to update these pieces of information, the procedures of T201 and T202 may be omitted. For example, information necessary for protecting the primary system may be updated periodically. The cycle may be appropriately determined and may be set in units such as seconds, minutes, hours, days, weeks, and months.

Next, a procedure related to protection of the primary system is executed. A process from T301 to T305 in FIG. 3 is included in this procedure.

The communication device 110 executes a single station interference estimation process on the basis of the information necessary for protecting the primary system (T301). The single station interference estimation process is interference estimation based on the premise that a single communication device 110 is an interference source. In other words, interference with the primary system by only wireless communication of the communication device executing the single interference estimation is estimated.

Note that the primary system is actually interfered from a plurality of wireless communications using the same frequency. That is, it is necessary to consider aggregated interference from each communication device 110. This aggregated interference is calculated on the basis of a result of single station interference estimation of each communication device 110.

Note that, in this case, a correction value may be taken into consideration. For example, the correction value may be determined on the basis of three types (fixed/predetermined, flexible, flexible minimized) of interference margin schemes disclosed in ECC Report 186 of the European Telecommunications and Mail Office Conference (CEPT).

In the single station interference estimation process, the communication device 110 first determines desired communication parameters, that is, communication parameters to be used for a wireless communication service which is provided to the terminal 120. The determined communication parameters include at least a range of frequencies to be used (a frequency range) and maximum transmission power (maximum transmission power). The communication device 110 may determine a frequency range or the like by utilizing information acquired from the regulatory database.

The communication device 110 determines the frequency range of the communication parameters on the basis of the acquired exclusion zone information. Specifically, the communication device 110 checks whether the position of the communication device 110 (that is, its own position) is within the exclusion zone. If the position of the communication device 110 is within the exclusion zone, the communication device 110 determines a range outside of the frequency range associated with the exclusion zone as the frequency range of the communication parameters.

Figure 4:
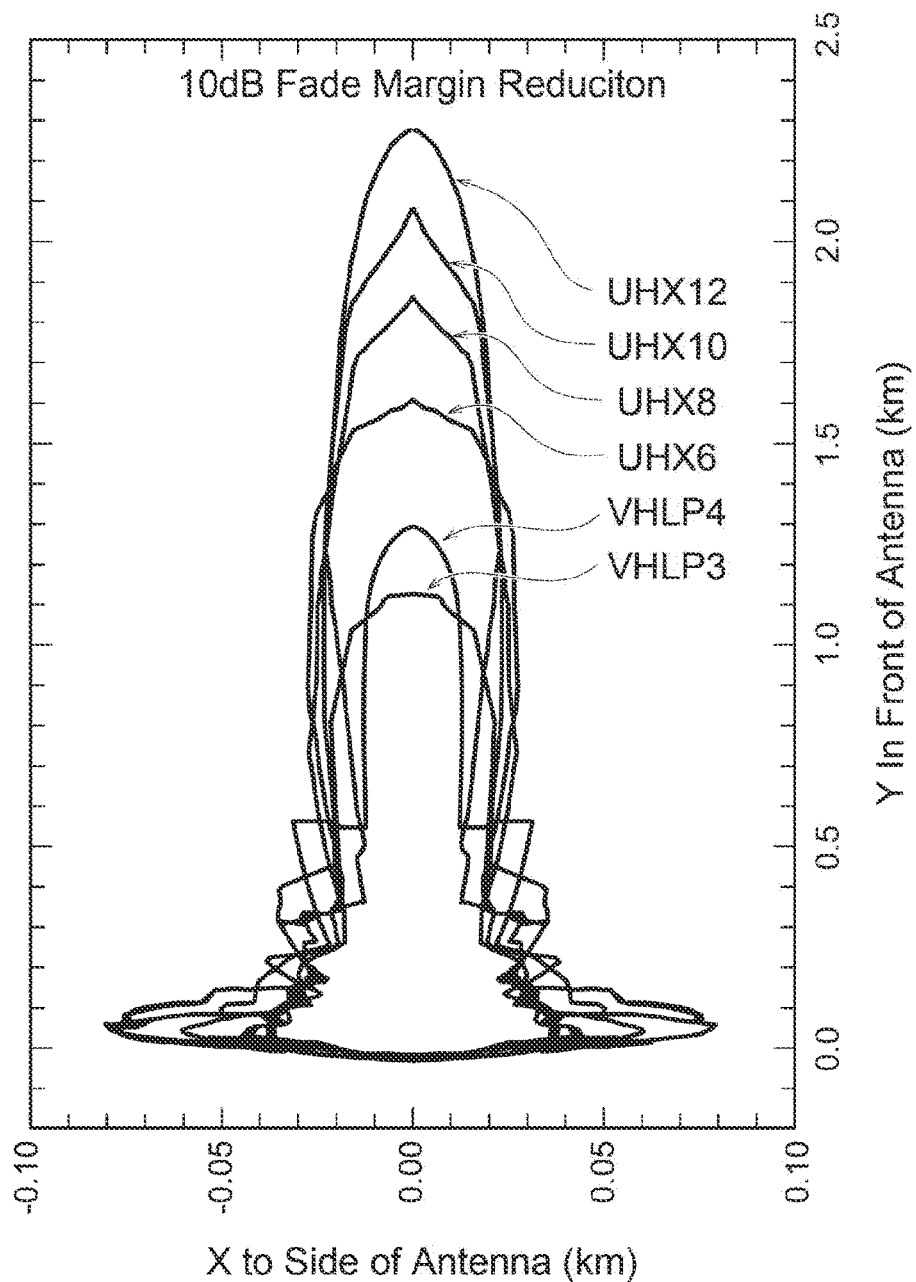
FIG. 4 is a diagram illustrating a calculation example of an exclusion zone.

In a case where the exclusion zone is not provided, the communication device 110 calculates the exclusion zone. The exclusion zone can be calculated by applying a known calculation model, for example, a calculation scheme of a PAL protection area (PPA) disclosed in Non Patent Document 5. Of course, an applicable calculation method is not limited to this scheme. FIG. 4 is a diagram illustrating a calculation example of an exclusion zone. In the example of FIG. 4, an exclusion zone in a fixed system in a 6 GHz band is illustrated. In addition, in the example of FIG. 4, six exclusion zones are illustrated, but antennas used in the exclusion zones are different as illustrated in FIG. 4.

In addition, the communication device 110 determines a frequency range to be used on the basis of information regarding an interference calculation target area associated with each primary system. Specifically, the communication device 110 checks whether its own position is within the interference calculation target area associated with each primary system. In a case where its own position is within the interference calculation target area, the communication device 110 determines a frequency range other than the frequency range associated with the interference calculation target area as the frequency range of the communication parameters.

Note that even in a frequency range in which some or all of the frequency ranges associated with the interference calculation target area overlap, the frequency range may be set as the frequency range of the communication parameter. For example, this is because when the maximum transmission power is reduced, the interference calculation target area is reduced, and therefore with the maximum transmission power in the present state, the own position can be within the interference calculation target area, but with the maximum transmission power after the reduction, the own position can be outside of the interference calculation target area.

Note that the communication parameters may be determined on the basis of the available range estimated in the available range estimation process based on the protection criteria map to be described below.

After the communication parameters are determined, the communication device 110 executes single station interference estimation. However, in the determination of the frequency range to be described above, the communication device 110 can recognize whether the own device is an interference calculation target. In a case in which the own device is not subject to interference calculation, the single station interference estimation to be described below may not be executed.

Note that in the protection of the primary system, there are point protection and area protection. In the point protection, interference with a predetermined protection point such as a reception antenna is protected. In the point protection, magnitude of interference that the communication device 110 gives interference with a protection point (giving interference) is required to be equal to or less than a reference value. Therefore, the giving interference at the protection point is estimated. In the area protection, interference with a predetermined protection area is protected. Specifically, in the area protection, the magnitude of giving interference at a plurality of protection points provided in the protection area is required to be equal to or less than a limit value. Therefore, the giving interference at the plurality of protection points is estimated.

Figure 5:
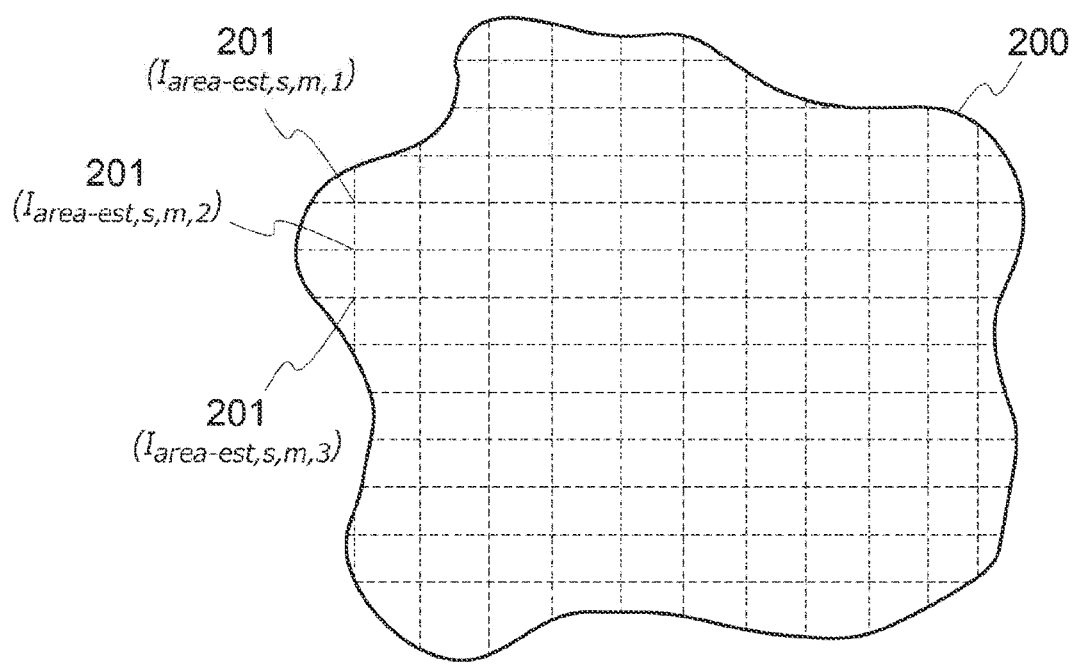
FIG. 5 is a diagram illustrating area protection.

FIG. 5 is a diagram illustrating area protection. An area surrounded by a solid line indicates a protection area 200 of the primary system. Although a dotted line (grid) is drawn in a grid pattern in the protection area, an intersection of the dotted lines is regarded as the protection point 201. Interference calculation at each protection point 201 is executed. If an interference value at each protection point 201 is less than or equal to the limit value, that protection point is considered to be protected.

For example, in a case where interference is considered as interference power, when the point protection is executed on a primary system m, giving interference power of a secondary system s (that is, the giving interference power of the communication device 110 belonging to the secondary system s) may be calculated with the following expression.

[Math. 1]

$$I_{point\text{-}est,s,m} = P_{MaxTx,Required,s} - L_{s\text{-}m} + G_{Rx,m} + F \quad (1)$$

$I_{point\text{-}est,s,m}$ represents the giving interference power, and its unit is dBm. $P_{MaxTx,Required,s}$ represents desired maximum equivalent isotropic radiated power (EIRP), and its unit is dBm. Note that, in a case where the aerial power (conducted power) is included in the desired communication parameters, a transmission antenna gain in a direction toward a point to be protected may be added to $P_{MaxTx,Required,s}$. $L_{s,m}$ represents a propagation loss between the primary system m and the secondary system s and its unit is dBm. The propagation loss $L_{s,m}$ is calculated using a designated propagation path model. Note that the calculation may be executed further using a clutter model as necessary. $G_{Rx,m}$ represents a reception antenna gain of the primary system. F represents a fading margin. Mainly, it is provided to compensate for a variation in power due to fading. A value of the fading margin F is determined in accordance with a type of primary system or the like.

Note that, although the foregoing expression is expressed in logarithm, an expression of antilogarithm notation and a numerical value may be used. The same applies to the following expressions.

Note that, when the point protection is required to be executed on a plurality of primary systems, the single station interference estimation is executed on each primary system. The giving interference power of the secondary system s with respect to the plurality of primary systems in the point protection is expressed in a set expression (vector) like the following expression. Note that, in the following expression, a total number of primary systems is M.

[Math. 2]

$$I_{point\text{-}est,s} = \{I_{point\text{-}est,s,1}, I_{point\text{-}est,s,2}, \ldots, I_{point\text{-}est,s,m}, \ldots, I_{point\text{-}est,s,M}\} \quad (2)$$

On the other hand, when the area protection is executed on the primary system m, the giving interference power of the secondary system s with respect to a certain point p in the protection area of the primary system m is calculated by the following expression.

[Math. 3]

$$I_{area\text{-}est,s,m,p} = P_{MaxTx,Required,s} - L_{s\text{-}m,p} + G_{Rx,m,p} + F \quad (3)$$

As illustrated in FIG. 5, the giving interference power of each protection point 201 is expressed by $I_{area\text{-}est,s,m,p}$ in the foregoing expression.

Note that a reference value designated in advance may be used to calculate the propagation losses $L_{s,m,p}$ the reception antenna gains $G_{Rx,m,p}$ of the primary system, and the like.

For example, a height of the reception antenna necessary for calculating the propagation loss $L_{s,m,p}$ may be used as the reference value.

The giving interference power of the secondary system s with respect to each point in the protection area of the primary system m is expressed in a set expression like the following expression. Note that, in the following expression, a total number of protection points is P.

[Math. 4]

$$I_{area\text{-}est,s,m} = \{I_{area\text{-}est,s,m,1}, I_{area\text{-}est,s,m,2}, \ldots, I_{area\text{-}est,s,m,p}, \ldots, I_{area\text{-}est,s,m,P}\} \quad (4)$$

Note that the foregoing set expression, that is, a set indicating the giving interference power of the secondary system with respect to each point in the protection area is referred to as a single station interference map.

Note that, when the area protection is executed on the plurality of primary systems, the single station interference estimation is executed on each primary system like the case of point protection. The giving interference power of the secondary system s with respect to the plurality of primary systems in the area protection is expressed in the following expression as a set that has the set as a constituent.

[Math. 5]

$$I_{area\text{-}est,s} = \{I_{area\text{-}est,s,1}, I_{area\text{-}est,s,2}, \ldots, I_{area\text{-}est,s,m}, \ldots, I_{area\text{-}est,s,M}\} \quad (5)$$

Note that the giving interference power of the secondary system s can also be expressed in a set expression like the following expression. In the following expression, the giving interference power of the secondary system s in both the point protection and the area protection can be expressed.

[Math. 6]

$$I_{est,s} = \{I_{point\text{-}est,s}, I_{area\text{-}est,s}\} \quad (6)$$

Note that when either point protection or area protection is not executed, any element of the above formula is a null set. In addition, in a case where the communication device 110 determines that the own device is not an interference calculation target, $I_{est,s}$ in the foregoing expression is a null set. $I_{area\text{-}est,s}$ and $I_{-est,s}$ are also single station interference maps, and the single interference estimation process can also be referred to as a process of generating a single station interference map.

After the single interference estimation process, an interference information notification (an estimated interference notification) is executed (T302). In other words, the communication device 110 transmits the determined communication parameters such as the generated single station interference map to the assistance server 140. Note that the single station interference map is usually converted into a format suitable for a communication protocol and the converted map is transmitted. For example, the single station interference map may be converted into a form of a JavaScript Object Notation (JSON) object. FIG. 6 is a diagram illustrating an example of conversion into the format of the JSON object. Note that " . . . <omitted> . . . " in FIG. 6 does not conform to JSON description rules, and indicates that description thereof is omitted.

In addition, an ID for identifying an entity to be protected is enclosed in transmission of the single station interference map so that a protection target entity (a protected entity) corresponding to the single station interference map, such as the protection point and the protection area, is recognized by the assistance server 140. In addition, an ID for identifying the communication device 110 which is a secondary system may also be enclosed.

In addition, the transmission of the single station interference map preferably includes information indicating whether this transmission is executed for the first time. That is, it is preferable to notify the assistance server 140 of whether to transmit the single station interference map for the first time or to update the single station interference map.

For example, in the conversion example of FIG. 6, an "update" field is illustrated, but a value of the "update" field indicates whether or not the value is an update notification of the single station interference map. A case where the value of the "update" field is true indicates the update notification. A case where the value is false indicates new notification. Note that the "update" field does not need to be of a Boolean type, and may be of a string type or the like to indicate various states.

The assistance server 140 that has received the interference information notification executes an authorization process (Authorization) on the basis of the single station interference map from the communication device 110 (T303).

The authorization process by the assistance server 140 is a process of determining whether the communication device 110 can use radio waves without causing harmful interference with the primary system on the basis of information regarding interference of a stored communication device and determining whether to authorize the use of radio waves on the basis of a determination result. In the present disclosure, the authorizing process is executed in the following steps.

First, the assistance server 140 extracts a protection criteria map related to the single station interference map notification of which is provided in the interference information notification from a plurality of stored protection criteria maps. That is, the protection criteria map to be used in the present authorization process is selected. Specifically, the single station interference map notification of which is provided and the protection criteria map that is the same protection target entity and the same protection target parameter are extracted.

The protection criteria map is a type of information regarding interference of a communication device and is a map indicating a present value of a protection target parameter in an entity to be protected. For example, in a case where a maximum allowable interference power level of a protection point is not to be exceeded, the protection criteria map indicates an aggregated value (aggregated interference power) of the giving interference power by the communication device 110 that has been authorized to be used so far. That is, in this case, the protection criteria map can also be referred to as an aggregated interference power map. In a case where a minimum C/I is designated, the protection criteria map is a map of the C/I by the communication device 110 that has been authorized to be used so far.

The assistance server 140 updates the protection criteria map on the basis of the single station interference map notification of which is provided. For example, in a case where the maximum allowable interference power level is not to be exceeded, a value indicated in the single station interference map notification of which is provided in the interference information notification is added to a present value of the protection criteria map. Note that, it is preferable that a temporary protection criteria map is generated by duplicating the stored protection criteria map and the temporary protection criteria map is updated.

Note that, in a case where there is no communication device 110 which has been authorized to be used so far, a protection criteria map is newly generated. Alternatively, the protection criteria map in the initial state may be updated. Note that the values of all the elements of the protection criteria map in the initial state, in other words, the initial values of all the elements of the protection criteria map, are 0.

The assistance server 140 determines whether to authorize the radio wave transmission based on the desired communication parameter to the communication device 110 that has provided notification of the interference information notification on the basis of the protection criteria map updated in this manner. Note that it is assumed that threshold values (limit values) for determination, such as the maximum allowable interference power level and the minimum C/I, are determined before execution of the authorization process, for example, at the time of registration of the primary system.

For example, in a case where the aggregated interference power of the updated protection criteria map exceeds a predetermined limit value at any protection point in the protection area, the assistance server 140 may determine that the communication device 110 that has provided notification of the interference information notification does not authorize the desired communication parameter. Otherwise, the assistance server 140 may determine to authorize the desired communication parameter.

As described above, in a case where a sum of the aggregated interference with the primary system by each communication device 110 authorized to execute wireless communication and the interference estimated in the single interference estimation included in the present interference information notification does not exceed the limit value of the interference with the primary system, the assistance server 140 authorizes the communication device 110 that has executed the current interference information notification to execute wireless communication.

Note that, in a case where it is determined that the communication parameters are not authorized, the assistance server 140 returns the updated protection criteria map to the state before the update. When the temporary protection criteria map is updated, the temporary protection criteria map is only required to be simply be deleted. When determining to authorize the communication parameter, the assistance server 140 stores the updated protection criteria map as it is. When the temporary protection criteria map is updated, the stored protection criteria map is replaced with the updated temporary protection criteria map. In this way, the value of the protection target parameter of the stored protection criteria map is updated, and the process can be executed on the next communication device that has provided notification of the interference information notification.

Note that the assistance server 140 may also record the single station interference map of each of the communication devices 110 separately from the protection criteria map.

The assistance server 140 provides notification of the authorization result as a response to the interference information notification (T304). The response content varies depending on a difference in the authorization result.

When the desired communication parameter is determined not to be authorized, the assistance server 140 may simply reject use of the desired communication parameter. In this case, the assistance server 140 generates a rejection response indicating the rejection and transmits the rejection response to the communication device 110.

Alternatively, the assistance server 140 may calculate an adjustment value of the communication parameter and transmit the adjustment value along with the rejection response. In that case, the use of the desired communication parameter is rejected. However, if the adjustment value of the communication parameter is permitted for the communication device 110, a shared frequency of the communication device 110 can be used. For example, the adjustment value of the transmit power may be an excess of the aggregated interference power from the maximum allowable interference power level. Note that, in this case, the communication device 110 that has received the adjustment value needs to transmit the adjustment value to the access server as a value of desired transmission power.

Alternatively, the assistance server 140 may transmit the adjustment value of the communication parameter not along with the rejection response but along with an authorization response. The authorization response indicates authorization on the assumption that the transmission power serves as an adjustment value. In this case, the communication device 110 that has received the adjustment value does not need to transmit the adjustment value as a value of desired transmission power to the access server. In addition, in this case, the access server updates the protection criteria map on the basis of the adjustment value of the communication parameter.

Note that, in a case where the desired communication parameter is received again from the communication device 110 after the authorization result indicating that the desired communication parameter is not authorized is transmitted to the communication device 110, when the single station interference map notification of which is previously provided from the communication device 110 is recorded, the assistance server 140 may execute the authorization process on the basis of a difference between the previous and current single station interference maps.

The communication device 110 that has received the authorization result executes a process on the basis of the response content. The process content also varies depending on a difference in the response content.

When the rejection response is received without the adjustment value, the communication device 110 changes the desired communication parameter. Then, a single station interference recording process is executed again to provide notification of interference information. That is, the process from T301 to T304 is executed again.

When the rejection response is received along with the adjustment value, the communication device 110 determines whether to accept the received adjustment value. Then, the desired communication parameter is changed on the basis of the determination, and the single station interference recording process is executed again. In this case, the process from T301 to T304 is also executed again.

When the authorization response is received, the communication device 110 sets the communication parameter (T305). Here, when the adjustment value is received along with the authorization response, the communication device 110 sets the communication parameter on the basis of the received adjustment value. When the authorization response is received without the adjustment value, the communication device 110 sets the desired communication parameter as it is as the communication parameter.

By executing the process as in the communication sequence of FIG. 3, it is possible to protect the primary system from the aggregated interference of the communication devices 110 while avoiding the communication between the communication devices 110.

In the communication sequence of FIG. 3, since the assistance server 140 holds information regarding the aggregated interference such as a protection criteria map, the assistance server 140 authorizes communication of the communication device 110 on the basis of the aggregated interference. However, for the communication device 110 can also obtain information regarding the aggregated interference and check whether to use the communication parameters.

Figure 7:
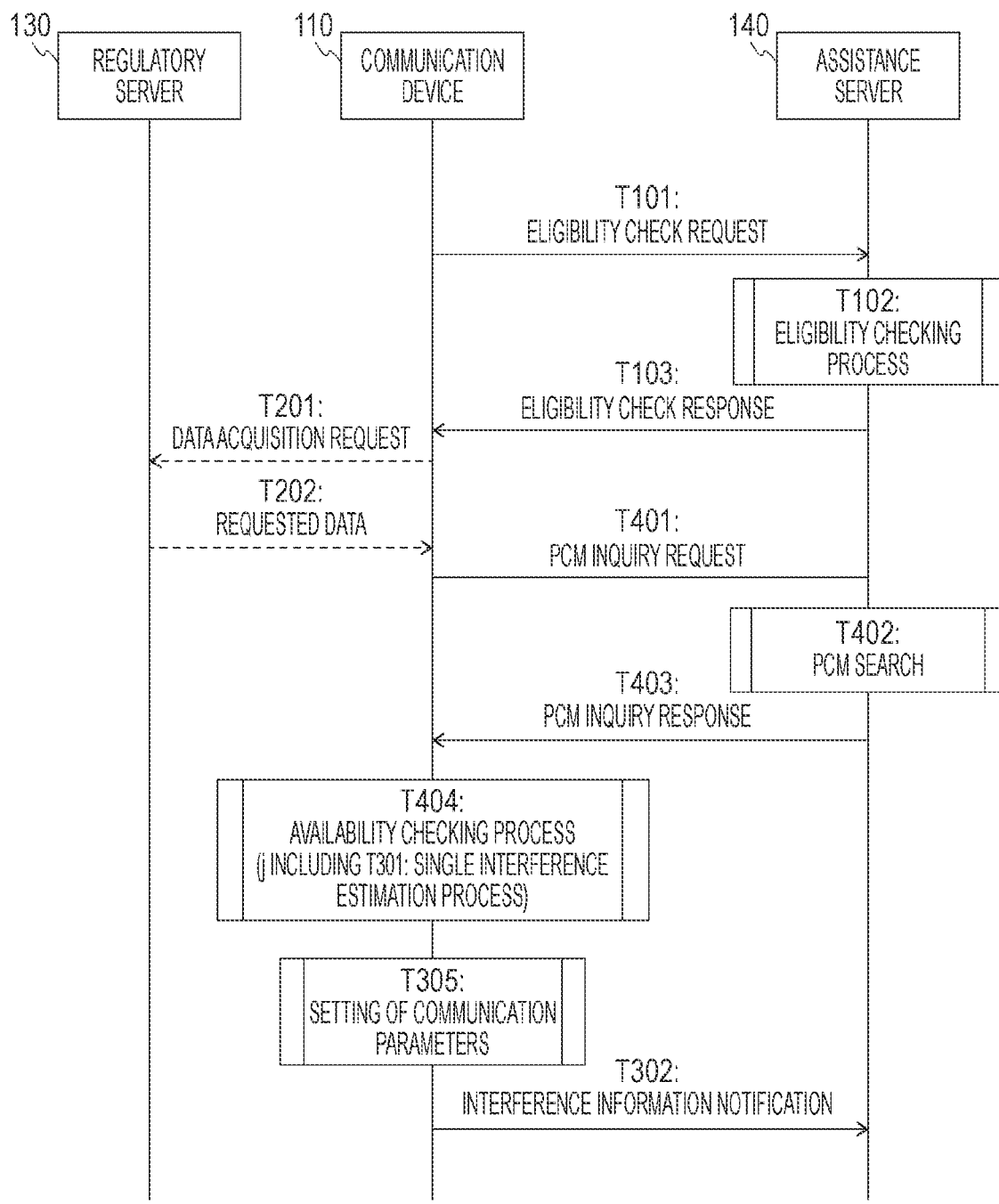
FIG. 7 is a diagram illustrating another example of the communication sequence.

FIG. 7 is a diagram illustrating another example of the communication sequence. The example of FIG. 7 is the same as the example of FIG. 3 until the communication device 110 acquires information necessary for protecting the primary system (T202), but the subsequent process is partially different.

The communication device 110 transmits an inquiry request for the protection criteria map to the assistance server 140 (T401). The assistance server 140 executes a search (PCM search) of the protection criteria map based on the inquiry request (T402). Thus, the protection criteria map corresponding to the inquiry request is extracted from the plurality of protection criteria maps. That is, the information regarding the aggregated interference of the communication devices 110 in which the protection entity, the use frequency, and the like are the same is acquired. Then, the assistance server 140 transmits the extracted protection criteria map to the communication device 110 as a response (an inquiry response) to the inquiry request (T403).

For example, the communication device 110 may include a protection target entity ID in the inquiry request. In this case, the assistance server 140 extracts the protection criteria map related to the protection target entity ID.

In addition, for example, the communication device 110 may include the positional information of the communication device 110 in the inquiry request. In this case, the assistance server 140 recognizes the protection target entity on the basis of the positional information and extracts the protection criteria map related to the recognized protection target entity.

In addition, the communication device 110 may request all the protection criteria maps. In this case, the assistance server 140 generates and replies with a dump file related to all the protection criteria maps. Note that, since the size of the dump file can be enormous, information regarding a resource for downloading the dump file, for example, a uniform resource identifier (URI), a URL, or the like may be returned as a response instead of the dump file.

The communication device 110 executes an availability checking process on the basis of the received protection criteria map. (T404). That is, the communication device 110 checks whether a desired communication parameter is available.

Specifically, the communication device 110 calculates an interference margin, that is, an allowable interference amount, using the received protection criteria map. It is possible to calculate an allowable interference amount as a difference between a value of the aggregated interference indicated by the protection criteria map and a limit value of the aggregated interference. The communication device 110 estimates the giving interference amount with the desired communication parameter by executing the single station interference estimation and recognizes that the giving interference amount is available when the giving interference amount falls within the allowable interference amount. Note that the communication device 110 may calculate the available range of the communication parameter by changing the value of the communication parameter or the like.

For example, an example of a method of calculating a range of applicable transmission power in the frequency range associated with the protection target entity will be described. In the method, a path loss $L_{total}$ to which the reception antenna gain and the fading margin are added is used. When the interference margin is represented as $I_{margin}$ and a transmission power upper limit is represented as $P_{MaxEirp}$, the following inequality holds.

[Math. 7]

$$I_{margin} \geq P_{MaxEirp} - L_{total} \quad (7)$$

Accordingly, a range of the transmission power is obtained by the following expression.

[Math. 8]

$$P_{MaxEirp} \leq I_{margin} + L_{total} \quad (8)$$

Note that a unit of the path loss is dB, and a unit of the transmission power upper limit $P_{MaxEirp}$ is dBm.

Note that although the communication device 110 calculates the allowable interference amount from the protection criteria map in the above description, the assistance server 140 may calculate the allowable interference amount and transmit the allowable interference amount a to the communication device 110. Note that, in this case, the assistance server 140 may adjust a numerical value of the allowable interference amount in advance by adding the presence of the plurality of communication devices 110.

The communication device 110 sets the communication parameter from the available range calculated in this manner (T305). In this case, the interference limit value defined in the primary system is not exceeded. Therefore, as in the example of FIG. 3, the assistance server 140 may be authorized to start the wireless communication. However, unlike the example of FIG. 3, it is also possible to start the wireless communication without authorization of the assistance server 140. That is, the communication device 110 may check that the sum of the interference estimated by executing the own single interference estimation and the aggregated interference of the plurality of communication devices before the execution of the single interference estimation obtained from the interference information from the assistance server 140 does not exceed the limit value of the interference with the primary system and may execute the wireless communication using the set value used for the single interference estimation in a case where the sum is checked.

Regardless of necessity of the authorization of the assistance server 140, as in the example of FIG. 3, the assistance server 140 is notified of interference due to the communication parameter to be used (T302). This is because the protection criteria map stored by the assistance server 140 is updated on the basis of the notification contents. Note that the communication device 110 may update the protection criteria map and transmit the updated protection criteria map to the assistance server 140. The assistance server 140 is only required to replace the stored protection criteria map with a received protection criteria map.

In addition, a situation in which there is the plurality of assistance servers 140 is also assumed. In that case, if there is no problem in exchange of information between the assistance servers 140, it is preferable that the plurality of assistance servers 140 exchange information and the assistance servers 140 have a common protection criteria map.

Note that, in order to facilitate the plurality of assistance servers 140 to have the common protection criteria map, the single station interference map estimated by the communication device 110 is preferably recorded only on a specific (preferably one) assistance server 140. In addition, it is preferable that each of the assistance servers 140 distinctively records the protection criteria map calculated for the managed communication device 110 and the protection criteria map generated by the plurality of assistance servers 140 in cooperation.

For example, each of the assistance servers 140 transmits a protection criteria map $PCM_{self}$ related to the managed communication device 110 to the other assistance server 140. Thus, each of the assistance servers 140 receives a protection criteria map $PCM_{other}$ related to the communication device 110 under the control of the assistance server 140 from the other assistance server 140. Then, each of the assistance servers 140 can calculate a common protection criteria map $PCM_{common}$ with the following expression.

[Math. 9]

$$PCM_{common} = PCM_{self} + \Sigma PCM_{other} \quad (9)$$

The symbol "+" in the above expression means that a sum of the protection criteria maps is obtained for each protection target entity. The common protection criteria map $PCM_{common}$ is the same in all the assistance servers 140. Note that the assistance server 140 of a slave may transmit the protection criteria map $PCM_{self}$ to a master and the master assistance server 140 may calculate the common protection criteria map $PCM_{common}$ on the basis of the above expression and transmit the common protection criteria map $PCM_{common}$ to the slave assistance server 140.

As described above, according to the present disclosure, before the communication device 110 executes wireless communication, the single interference estimation is executed on the primary system to estimate interference. In addition, in a case where the sum of the interference and the aggregated interference of the plurality of communication devices with the primary system before the execution of the single interference estimation obtained from the interference information recorded by the assistance server 140 does not exceed the limit value, the wireless communication is executed. Thus, the primary system can be sufficiently protected. In addition, since information is not exchanged between the communication devices 110, a security problem can also be prevented.

Figure 8:
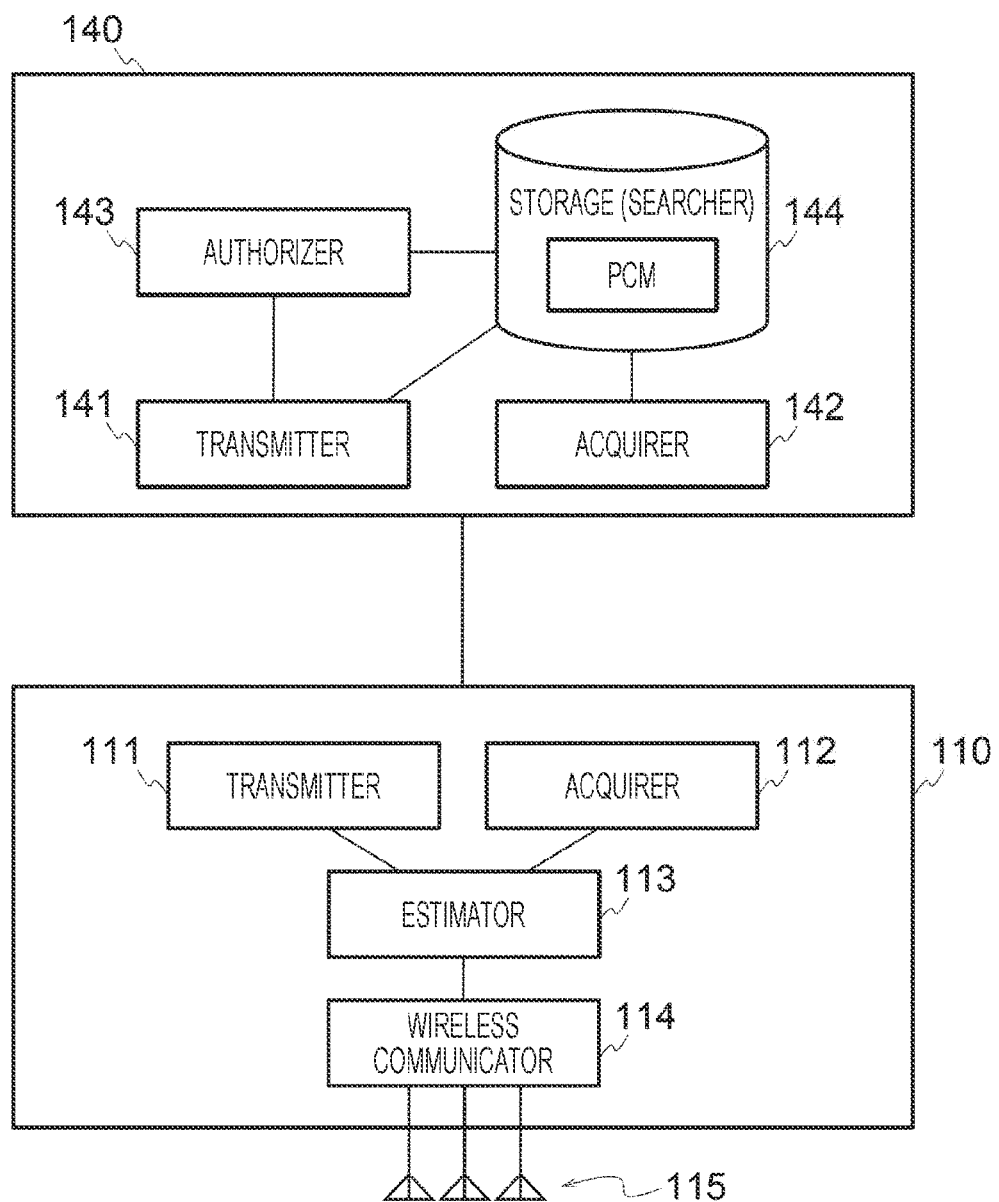
FIG. 8 is a diagram illustrating an example of constituents of a communication device and an assistance server.

Note that the constituents of each device are provided so that the foregoing process is executed. FIG. 8 is a diagram illustrating an example of constituents of the communication device 110 and the assistance server 140. In the example of FIG. 8, the communication device 110 includes a transmitter 111, an acquirer 112, an estimator 113, a wireless communicator 114, and an antenna 115. In addition, the assistance server 140 includes a transmitter 141, an acquirer 142, an authorizer 143, and a storage 144.

The transmitter 111 of the communication device 110 transmits the eligibility check request (T101), the interference information notification (T302), and a PCM inquiry request (T401) to the assistance server 140 illustrated in FIGS. 3 and 7. The acquirer 112 of the communication device 110 acquires (receives) the eligibility check response (T103), the authorization result (T304), and a PCM request response (T403) from the assistance server 140. The estimator 113 is responsible for the single interference estimation process (T301) and the availability checking process (T404), and executes each process included in the processes. When the authorization is received, the wireless communicator 114 executes wireless communication by performing the setting of the communication parameter (T305), and radio waves for the wireless communication are emitted from the antenna 115.

The transmitter 141 of the assistance server 140 transmits the eligibility check response (T103), the authorization result (T304), and the PCM request response (T403). The acquirer 142 of the assistance server 140 receives the eligibility check request (T101), the interference information notification (T302), and the PCM inquiry request (T401). The authorizer is responsible for the authorizing process (T303) and executes each process included in the authorizing process. The storage stores the protection criteria map. The value of the aggregated interference calculated by the authorizer is recorded in the protection criteria map each time authorizing process of each communication device 110 is executed (the value is updated). Since the record is saved, it is possible to determine whether or not the upper limit value of interference is exceeded in the present authorization process. The storage also manages the PCM search (T402).

Since the constituents illustrated in FIG. 8 can be realized by a known communication device, software operating on a computer, or the like, the details thereof are omitted. For example, the PCM search can be realized by software that has a database function.

Note that, in the example of FIG. 8, constituents in charge of executing the above-described process are illustrated, and constituents related to other process are omitted.

Note that, although the communication device 110 directly communicates with the assistance server 140 as described above, actually, a substitute server such as a proxy server or a network manager may act as communicating with the assistance server 140 instead of the communication device 110.

Figure 9:
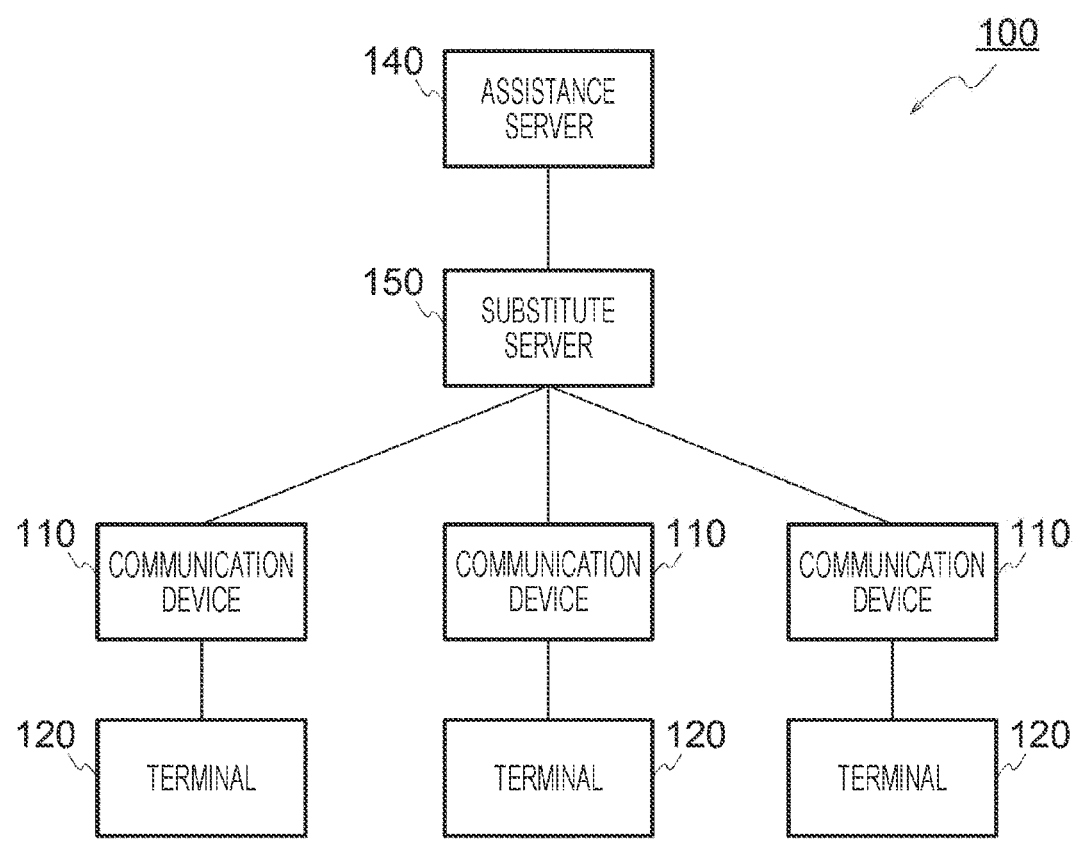
FIG. 9 is a diagram illustrating an example of a system in which a substitute server substitutes for communication with an assistance server.

FIG. 9 is a diagram illustrating an example of a system in which the substitute server substitutes for communication with the assistance server 140. Note that the regulatory database 130 is omitted. In the example of FIG. 9, the communication device 110 and the assistance server 140 communicate with each other via the substitute server without executing direct communication.

In addition, the substitute server may substitute for the process of the communication device 110 in the communication sequence illustrated in FIGS. 3 and 7. In other words, the substitute server may control the communication device 110. For example, the communication device 110 receives an instruction to set communication parameters from the substitute server. The communication device 110 may execute only the wireless communication in the setting and the substitute server may execute other processes. When the substitute server receives an adjustment value along with an authorization response, the substitute server is only required to instruct the communication device 110 to set the communication parameter on the basis of the received adjustment value. When the substitute server receives the authorization response without the adjustment value, the substitute server is only required to instruct the communication device 110 to set the desired communication parameter as the communication parameter as it is.

In this way, the substitute server is also regarded as the communication device 110 since the substitute server is in charge of some of the processes of the communication device 110.

Note that, although not illustrated in FIG. 9, communication with the regulatory database 130 may be executed by the substitute server or the communication device 110. However, when the substitute server executes the single station interference estimation, the substitute server communicates with the regulatory database 130. Note that, as described above, if information necessary for protecting the primary system is included, communication with the regulatory database 130 may not be executed.

Note that, in the interference information notification, the substitute server may adjust a value of a result of the single station interference on the basis of the number of communication devices 110 to be managed or the like, and notify the assistance server 140 of the adjusted value. In addition, when the communication parameters of the communication device 110 are instructed, the substitute server may adjust the communication parameters by adding the number of communication devices 110 or the like.

Note that, according to the above-described embodiments, the examples for embodying the present disclosure are given, and the present disclosure can be implemented in various other forms. For example, various modifications, substitutions, omissions, or combinations thereof can be made without departing from the gist of the present disclosure. Such modifications, substitutions, omissions, and the like are also included in the scope of the present disclosure and are included in the invention described in the claims and the equivalent scope thereof.

For example, the process executed by the assistance server 140 may be executed by a plurality of servers. For example, the eligibility checking process and the authorization process may be executed by separate servers.

In addition, the procedure of the processes described in the present disclosure, such as the above-described communication sequence, may be regarded as a method that has a series of these procedures. Alternatively, the procedure of the processes may be regarded as a program causing a computer to execute the series of procedures or a recording medium storing the program. A type of recording medium does not affect the embodiment of the present disclosure, and thus is not particularly limited.

Note that the present disclosure can be configured as follows.

[1]

A communication system including:
  a plurality of communication devices configured to execute wireless communication using a frequency of a specific frequency band; and
  an information processing device configured to record information regarding interference of the plurality of communication devices with a protection system in the specific frequency band,
  in which the communication device
    executes single interference estimation on the protection system before executing the wireless communication to estimate interference of the wireless communication with the protection system, and
    executes the wireless communication in a case where a sum of aggregated interference of the plurality of communication devices with the protection system before executing the single interference estimation obtained from the information and interference estimated by executing the single interference estimation does not exceed a limit value of interference with the protection system.

[2]

The communication system according to [1], in which
  the communication device transmits a value of the interference estimated by executing the single interference estimation to the information processing device,
  the information processing device authorizes the execution of the wireless communication in a case where a sum of aggregated interference with the protection system due to each communication device authorized to execute the wireless communication and interference estimated by executing the single interference estimation does not exceed a limit value of interference with the protection system, and
  the communication device is authorized to execute the wireless communication and executes the wireless communication.

[3]

The communication system according to [2], in which the communication device
  acquires the information from the information processing device,
  executes checking that the sum of the aggregated interference of the plurality of communication devices with the protection system before executing the single interference estimation obtained from the information and the interference estimated by executing the single interference estimation does not exceed the limit value of the interference with the protection system, and
  executes the wireless communication using a set value used for the single interference estimation in a case where the checking is obtained.

[4]

The communication system according to any one of [1] to [3], in which
  the single interference estimation is estimation of interference with the protection system by only wireless communication of the communication device executing the single interference estimation.

[5]

A communication device including:
  an estimator configured to execute single interference estimation with respect to a protection system in a specific frequency band before executing wireless communication using a frequency of the specific frequency band to estimate interference of the wireless communication with the protection system; and
  a wireless communicator configured to execute the wireless communication in a case where a sum of aggregated interference of a plurality of communication devices with the protection system before executing the single interference estimation and interference estimated by executing the single interference estimation does not exceed a limit value of interference with the protection system.

[6]

The communication device according to [5], further including:
  a transmitter configured to transmit a value of the interference estimated by the executing the single interference estimation to a predetermined information processing device; and
  an acquirer configured to acquire authorization for the execution of the wireless communication from the information processing device in the case where the sum of the aggregated interference of the plurality of communication devices with the protection system before executing the single interference estimation and the interference estimated by executing the single interference estimation does not exceed the limit value of interference with the protection system, in which the wireless communicator is authorized to execute the wireless communication and executes the wireless communication.

[7]

The communication device according to [5], further including:
an acquirer configured to acquire information regarding interference of the plurality of communication devices with the protection system,
in which the wireless communicator
executes checking that the sum of the aggregated interference of the plurality of communication devices with the protection system before executing the single interference estimation obtained from the information and the interference estimated by executing the single interference estimation does not exceed the limit value of the interference with the protection system, and
executes the wireless communication using a set value used for the single interference estimation in a case where the checking is obtained.

[8]

The communication device according to any one of [5] to [7], in which
the single interference estimation is estimation of a value of interference with the protection system by only wireless communication of the communication device executing the single interference estimation.

[9]

An information processing device including:
an acquirer configured to acquire information regarding interference estimated in single interference estimation for a protection system in a specific frequency band, the single inference estimation being executed by each of a plurality of communication devices executing wireless communication using a frequency in the specific frequency band;
an authorizer configured to authorize execution of the wireless communication in a case where a sum of aggregated interference with the protection system due to each communication device authorized to execute the wireless communication and interference estimated by executing the single interference estimation does not exceed a limit value of interference with the protection system; and
a storage configured to store interference estimated by executing the single interference estimation as interference with the protection system when the execution of the wireless communication is authorized.

The information processing device according to [9], in which
the single interference estimation is estimation of a value of interference with the protection system by only wireless communication of the communication device executing the single interference estimation.

REFERENCE SIGNS LIST

100 Communication network
110 Communication device
111 Transmitter of communication device
112 Acquirer of communication device
113 Estimator
114 Wireless communicator
115 Antenna
120 Terminal
130 Regulatory database
140 Assistance server (information processing device)
141 Transmitter of assistance server
142 Acquirer of assistance server
143 Authorizer
144 Storage
200 Protection area
201 Protection point

The invention claimed is:

1. A communication system, comprising:
a plurality of communication devices, each of the plurality of communication devices is configured to execute wireless communication based on a frequency of a specific frequency band; and
an information processing device configured to record information regarding interference of the plurality of communication devices with a protection system, wherein the protection system is a primary wireless system that operates in the specific frequency band, wherein
each of the plurality of communication devices is configured to:
execute single interference estimation on the protection system, before the execution of the wireless communication, to estimate interference of the wireless communication with the protection system,
execute the wireless communication in a case where a sum of
aggregated interference of the plurality of communication devices with the protection system, before the execution of the single interference estimation, obtained from the information, and
interference estimated based on the execution of the single interference estimation,
does not exceed a limit value of interference with the protection system, and
the protection system includes the plurality of communication devices.

2. The communication system according to claim 1, wherein
each of the plurality of communication devices is further configured to transmit a value of the interference, estimated based on the execution of the single interference estimation, to the information processing device,
the information processing device is further configured to authorize the execution of the wireless communication in a case where a sum of
aggregated interference with the protection system due to each of the plurality of communication devices authorized to execute the wireless communication, and
interference estimated based on the execution of the single interference estimation,
does not exceed the limit value of interference with the protection system, and
each of the plurality of communication devices is authorized to execute the wireless communication.

3. The communication system according to claim 1, wherein each of the plurality of communication devices is further configured to:
acquire the information from the information processing device,
check that the sum of
the aggregated interference of the plurality of communication devices with the protection system before the execution of the single interference estimation obtained from the information, and the interference estimated by the execution of the single interference estimation, does not exceed the limit value of the interference with the protection system, and execute the wireless communication based on a set value used for the single interference estimation in a case where a result of the check is obtained.

4. The communication system according to claim 1, wherein the single interference estimation is estimation of interference with the protection system by only wireless communication of each of the plurality of communication devices that executes the single interference estimation.

5. A communication device, comprising:
an estimator configured to execute single interference estimation with respect to a protection system in a specific frequency band, before execution of wireless communication, to estimate interference of the wireless communication with the protection system, wherein
the execution of the wireless communication is based on a frequency of the specific frequency band, and
the protection system is a primary wireless system that operates in the specific frequency band; and
a wireless communicator configured to execute the wireless communication in a case where a sum of
aggregated interference of a plurality of communication devices with the protection system before the execution of the single interference estimation, and
interference estimated based on the execution of the single interference estimation,
does not exceed a limit value of interference with the protection system, wherein the plurality of communication devices includes the communication device.

6. The communication device according to claim 5, further comprising:
a transmitter configured to transmit a value of the interference, estimated based on the execution of the single interference estimation, to a specific information processing device; and
an acquirer configured to acquire authorization for the execution of the wireless communication from the information processing device in the case where the sum of
the aggregated interference of the plurality of communication devices with the protection system before the execution of the single interference estimation, and
the interference estimated based on the execution of the single interference estimation,
does not exceed the limit value of interference with the protection system,
wherein the wireless communicator is authorized to execute the wireless communication.

7. The communication device according to claim 5, further comprising:
an acquirer configured to acquire information regarding interference of the plurality of communication devices with the protection system,
wherein the wireless communicator is further configured to:
check that the sum of
the aggregated interference of the plurality of communication devices with the protection system, based on the execution of the single interference estimation, obtained from the information, and
the interference estimated based on the execution of the single interference estimation,
does not exceed the limit value of the interference with the protection system, and
execute the wireless communication based on a set value used for the single interference estimation, in a case where a result of the check is obtained.

8. The communication device according to claim 5, wherein the single interference estimation is estimation of a value of interference with the protection system by only wireless communication of each of the plurality of communication devices that executes the single interference estimation.

9. An information processing device, comprising:
an acquirer configured to acquire information regarding interference estimated in single interference estimation for a protection system in a specific frequency band, wherein
the single inference estimation being is executed by each of a plurality of communication devices, and
each of the plurality of communication devices executes wireless communication based on a frequency in the specific frequency band;
an authorizer configured to authorize execution of the wireless communication in a case where a sum of
aggregated interference with the protection system due to each of the plurality of communication devices authorized to execute the wireless communication, and
interference estimated based on the execution of the single interference estimation,
does not exceed a limit value of interference with the protection system; and
a storage configured to store the interference estimated, based on the execution of the single interference estimation, as interference with the protection system in a case where the execution of the wireless communication is authorized.

10. The information processing device according to claim 9, wherein the single interference estimation is estimation of a value of interference with the protection system by only wireless communication of each of the plurality of communication devices that executes the single interference estimation.

* * * * *